United States Patent [19]
McKindree

[11] 3,801,173
[45] Apr. 2, 1974

[54] CONNECTING ROD INSERT BEARING FOR INTERNAL COMBUSTION ENGINES

[76] Inventor: Delbert R. McKindree, 309 Ridge Ave., Butler, Pa. 16001

[22] Filed: Mar. 9, 1972

[21] Appl. No.: 233,100

[52] U.S. Cl. .............................................. 308/240
[51] Int. Cl. ............................................. F16c 33/10
[58] Field of Search ............ 308/237, 240, 100, 108

[56] References Cited
UNITED STATES PATENTS

| | | | |
|---|---|---|---|
| 2,901,297 | 8/1959 | Sternlicht | 308/240 |
| 2,131,170 | 9/1938 | Evans | 308/240 |
| 2,940,802 | 6/1960 | Love | 308/240 |
| 3,172,304 | 3/1965 | Robertson | 308/240 |
| 3,495,685 | 2/1970 | Van Rinsum | 308/240 |

FOREIGN PATENTS OR APPLICATIONS

| | | | |
|---|---|---|---|
| 561,446 | 5/1944 | Great Britain | 308/237 |

OTHER PUBLICATIONS
Automobile Engineer, "Plain Bearings," 1953, pg. 463–473.

Primary Examiner—Manuel A. Antonakas
Assistant Examiner—Barry Grossman
Attorney, Agent, or Firm—Parmelee, Miller, Welsh & Kratz

[57] ABSTRACT

The invention provides in an internal combustion engine, a connecting rod insert bearing of two 180° sections, the abutting ends of which are 90° removed from the dead center positions of the connecting rod and crank-shaft, and with the end portions of the sections being rabbeted on their inner faces so that together there is provided a transverse oil groove at each side of the liner where the ends abut. The arrangement extends the life of connecting rod bearings especially in high compression ratio engines while providing controlled oil pressure lubrication.

3 Claims, 4 Drawing Figures 3,801,173
FIG. 2. FIG. 1.
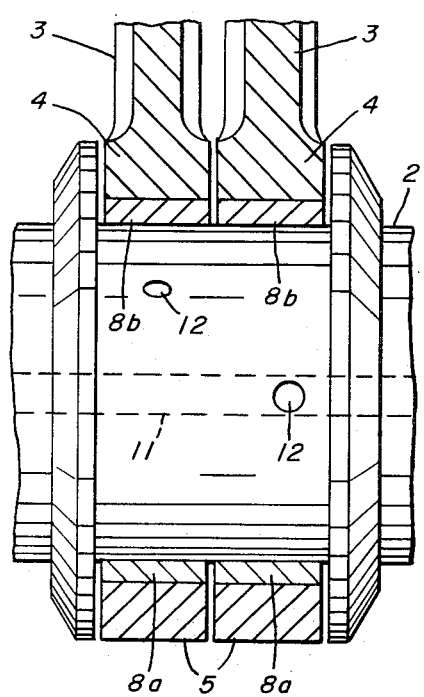
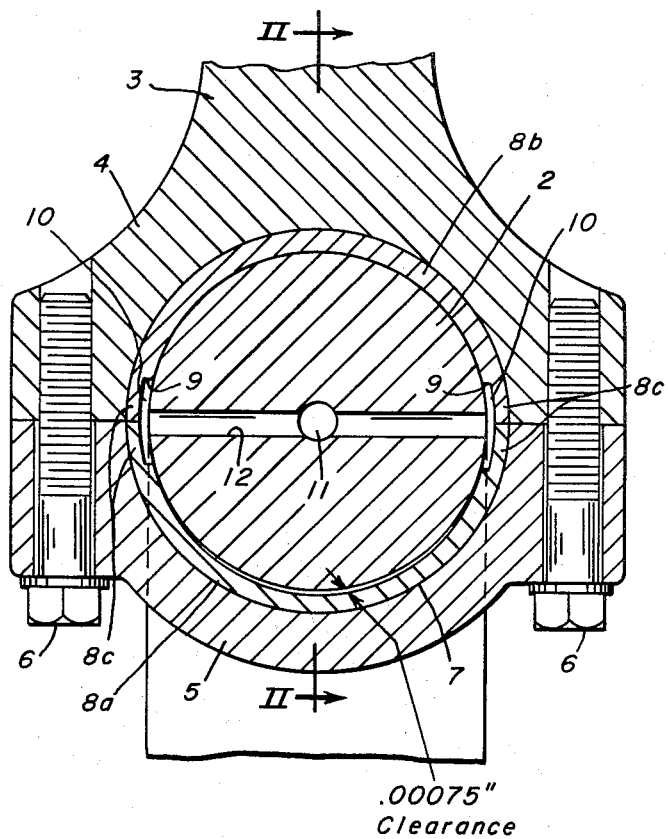
.00075" Clearance
FIG. 4. FIG. 3.
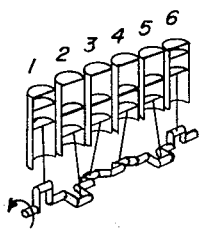
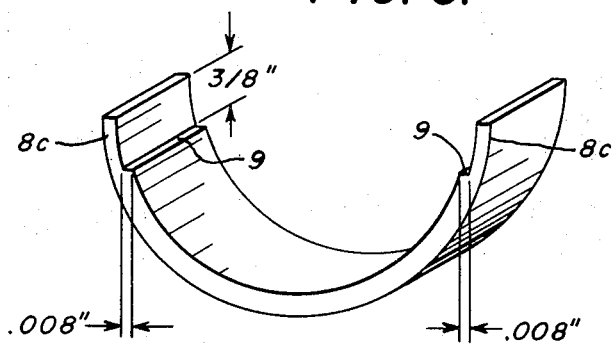

CONNECTING ROD INSERT BEARING FOR INTERNAL COMBUSTION ENGINES

This invention relates to reciprocating piston types of internal combustion engines, and more particularly to the insert bearing or liner for use between the connecting rods of internal combustion engines and the crankshaft. Although it is useful for any reciprocating internal combustion engine, the invention has special utility for engines having a high compression ratio, as in multi-cylinder racing cars and Diesel type engines.

In multi-cylinder internal combustion engines it is quite common for the insert bearing at the crank-shaft end of each connecting rod to be perhaps as much as 0.003 inches in diameter larger than the crank-shaft about which it fits and works, the clearance space being provided for the purpose of forming a lubricant receiving clearance inside the bearing sleeve and outside the crank shaft. The space so provided is essentially crescent-shaped with the crescent extending through at least 180° of arc. When the piston, on the firing stroke, pushes down on its connecting rod this clearance space is in the shape of a thin crescent in which oil may be held below the crank-shaft, but when the piston is descending on the suction stroke, so that the connecting rod, instead of pushing down on the crank-shaft, is being pulled down to suck in air, the crescent-shaped clearance space is then above the crank-shaft. Then as the piston moves up to compress the charge, the clearance space is again under the crank-shaft inside the bearing sleeve. In other words, there is a small amount of lost motion between the offset of the crankshaft and its surrounding connecting rod-bearing sleeve.

With proper lubrication and with moderate speed driving and usual compression ratios of automobile engines there is not too much of a "slap" when this clearance shifts from top to bottom, that is when the crankshaft eccentric moves relatively to the connecting rod bearing from one extreme position to the other inside the bearing sleeve, as the piston and connecting rod leads or lags with reference to the rotation of the crankshaft. However in high speed, high compression engines this rapid succession of short hammer-like blows may cause accelerated deterioration of the insert bearing, resulting in what is termed the "blowing" of the engine, usually from a broken connecting rod going through the cylinder wall. It is a leading cause of connecting rod trouble.

The present invention provides an insert bearing wherein the crank-shaft is confined against any free play at the sides of the bearing sleeve and the maximum cold clearance is of the order of 0.00075 of an inch in a typical engine, which is just sufficient to allow for thermal expansion as the engine heats up, so that under normal running conditions there is no free relative movement between the crank-shaft and connecting rod bearing such as has heretofore been necessary. The insert bearing, however, is made in two parts which fit together at each side of the crank-shaft, that is at a location which is 90° from the dead center positions which are the positions where the direction of travel of the connecting rod reverses. Where these parts of the bearing insert come together the confronting ends are thinned or rabbeted on their inner or bearing surfaces to provide an oil-holding groove at each side of the crank-shaft across the full width of the insert. Thinning the metal of the liner at these places is not objectionable because at about 90° from the top and bottom the thrust in a lateral direction between the connecting rod and the crank-shaft is relatively moderate as compared to the vertical thrust, so there is still adequate metal to resist the pressure on the bearing.

Experimental installations in racing cars have shown that bearings so constructed have held up amazingly well. In addition with this arrangement of the oil grooves it is possible, even at top speeds, to maintain the oil pressure at the optimum selected pressure, typically of about 40 lbs. per sq. in., and avoid abnormal pressure build-up or excessive flow through relief valves.

The invention may be more fully understood by reference to the accompanying drawing showing a preferred embodiment of the invention, and wherein:

FIG. 1 is a transverse section through the lower end of the connecting rod and one of the cranks of the crank shaft;

FIG. 2 is a fragmentary view, partly in section and partly in elevation, of the crank of FIG. 1 with two side-by-side connecting rods such as may be found in a V-type multi-cylinder engine, the section being substantially in the plane of line II—II of FIG. 1 with the crank-shaft in elevation;

FIG. 3 is a perspective view of a single section of the bearing liner shown in FIG. 1 removed from the connecting rod in which it is normally received; and FIG. 4 is a schematic diagram of a multi-cylinder engine and crank-shaft for the purpose of illustrating and explaining this invention.

In the drawing 2 designates one of the "cranks" of a multi-cylinder internal combustion engine, this portion of the crank-shaft, as is always the case, being closely machined to a circular cross-section. Two connecting rods are fragmentarily shown, each being of similar construction, and each is designated 3, and each is typical of all the other connecting rods of a multi-cylinder engine.

Each connecting rod has an integral yoke portion 4 that straddles the crank-shaft portion 2 and each has a complementary cap member 5 that embraces the other half of the crank portion 2. Bolts 6 at each side of the assembly hold the cap and yoke portions of the connecting rod together.

The opening through the connecting rod that encircles the crank-shaft 2 is circular but larger in diameter than the part 2 of the crank-shaft, providing clearance for the bearing insert or liner, designated generally as 7 and which is formed of two matching generally half sections 8a and 8b with the terminal edges of one section abutting the terminal edges of the other. While this liner has an exterior that fits in the opening in the end of the connecting rod, its interior is slightly elliptical so that when the engine is cold there is a clearance typically of the order of 0.00075 of an inch, plus or minus perhaps 0.00015 inch between the crank-shaft and the lining or insert, when the connecting rod is on a dead center position at the top or bottom of its stroke, but which may vary with engines of different sizes. After the engine heats up this slight clearance will no longer be present and the liner will make full contact around the crank-shaft except as hereinafter explained.

The free confronting end portions 8c of the two sections of the liner are rabbeted or thinned down on their crankshaft engaging surfaces a short distance, typically about three-eighths of an inch, from the terminal edge so as to form a transverse shoulder 9 at the inner end of each such thinned section of about 0.008 of an inch in thickness whereby the surface of the end portions of each section are clear of contact with the crank-shaft, and there are formed by the two confronting end portions 8c of the two liner sections two transverse channels 10 which are separated 180° and are each 90° removed from the longitudinal center line of the connecting rod when it is on the dead center position above described and these channels are of uniform width from one edge to the other of the liner and the shoulders forming the sides of the channels are parallel. Except for these grooves, the remaining portions of the sections are of uniform thickness and the crank contact surface is free of recesses or residue-retaining cavities.

In FIG. 1, where the clearances are perhaps somewhat exaggerated for purposes of illustration and the crank-shaft is tight against the liner at the top with the crescent-shaped clearance space—which is only visible when the engine is cold—is under the crank-shaft, it will be seen that the crank-shaft still has a bearing contact with the liner at and just below the lower shoulders 9 of the liner, as well as full contact therewith above the upper shoulders 9. It will be apparent that if this condition is reversed and the crescent-shaped clearance is above the crank-shaft, it will then have contact with the bearing insert at and just above the upper shoulders 9 and full contact around the bottom of the crank-shaft below the grooves 10. I term these areas at and just above or below the shoulders 9 of the liner the "holding points" so that the crank-shaft has adequate lateral support to resist side thrust and prevent looseness at all times notwithstanding the provision of the transverse channels 10 which are several degrees of arc in width, at each side of the shaft. This is especially so since at no time is there side thrust between the bearing liner and the crank-shaft comparable to the thrust or pressure vertically. In other words the channels 10 are located where the thrust of the crank-shaft against the bearing is always at the minimum.

The crank-shaft is provided with the usual central oil duct 11 with a radial or diametrically-extending passage 12 leading from this duct to the periphery of the crank-shaft, so that as the shaft rotates in the bearing it will momentarily feed oil under pressure into the transverse channels. This oil will then in part lubricate the crank-shaft as it rotates past the grooves so that twice in each revolution of the crank-shaft each point on its surface receives lubrication. This of course is in addition to oil which is always present at the outer ends of the passages 12. Excess lubricant can escape into the crank case from the ends of these channels 10.

Since, as shown in FIG. 4, the crank-shaft of a multi-cylinder engine has several eccentric crank portions similar to the portion 2 at various angles to each other, some or all of such radial or diametrically-extending passages 12 are positioned out of phase with one another, and at least one passage will practically always be open to a similar channel in another bearing. In other words, in a six or eight cylinder engine, for example, one such passage 12 is closing after passing a channel 10 as another is opening into its channel, and oil is never fully blocked off nor is it flowing into the channels 10 of more than two connecting rods in such an engine at one time, or at least the number of free-flowing outlets averages about constant. As an example, and for the purpose of adequate disclosure, FIG. 4 shows diagrammatically a typical six-cylinder four-cycle engine, and if the oil passages and grooves are arranged as shown in the section in FIG. 1 with only one connecting rod for each crank, connecting rods for cylinders 1 and 6 will be on dead center so as to receive oil. No. 1 is about to fire, and No. 6 about to induct air. The piston in cylinder No. 2 is nearing the end of its induction stroke and piston in No. 3 is going up on the exhaust stroke, and the piston of No. 4 is raising on its compression stroke. No. 5, which can be paired with No. 2 is nearing the end of its power stroke. After Nos. 1 and 6 clear dead center, pistons 2 and 5 will next be on dead center at the bottom, then the pistons 3 and 4 will be on dead center at the top. For this reason each connecting rod bearing receives adequate lubrication but the oil pump supplies oil to a substantially uniform but constantly changing escape path. Hence there is controlled pressure at each bearing, but there is no build-up of oil pressure in the lubricating system because of inadequate provision for the escape of oil and no failure of pressure due to inadequate restriction in the oil escape outlets. Tests with an eight-cylinder stock car prepared for racing have shown that the oil pressure gauge over a wide range of speeds will hold substantially constant at the selected pressure of 40 lbs.

To more clearly illustrate this, I have shown, in FIG. 2, two connecting rods on the same crank portion 2 of a multi-cylinder V-engine with a clearance of about 0.001 between the bearing for the two rods. It will be seen that if the shaft is rotating clockwise, the radial passage 12 of the right unit is on the horizontal center line in this figure, and the passage 12 for the other one lags behind it a distance just about the same as the width of the channels 10 so that if these channels 10 are aligned for the two connecting rod bearings, the passage 12 for one rod bearing will be moving out of register with its oil channel 10 just as the other is opening into its corresponding oil channel, and some such staggered sequence follows with all other connecting rods in a multi-cylinder engine.

The invention therefore provides for controlled oil pressure for the connecting rod insert bearings and engine lubricating system without the extended crescent-shaped oil clearance space now commonly provided extending about 180° or so above or below the crank portion of the crank-shaft, and which, as hereinbefore explained, results in the constant slap or pounding that accelerates bearing damage in conventional engines with bearings as now constructed and especially where the engines may be designed or are rebuilt to substantially increase the compression ratio required for racing. Important to the present invention are the four holding points at 9 where there is always bearing contact between the crank-shaft portion 2 so that notwithstanding the width of the channels 12, the shaft has good lateral bearing contact at all times. In the foregoing description dimensions are illustrative. Should higher oil pressures be required, the grooves 10 can be of less depth or width, and with larger or smaller cranks or with fewer or more cylinders, different dimensions may apply.

I claim:

1. A connectinrg rod insert bearing comprising two semi-circular sections the ends of which are designed to be placed in abutting relation with the ends of the other to form a complete circle, both end portions of each section being rabbetted on its inner face the full width of the section to form a thin terminal portion with a shoulder spaced back from the end, the shoulders of the abutting ends being parallel such that each two abutting ends together provide a transverse oil groove of uniform width from one edge to the other of the bearing insert with the shoulders forming parallel boundaries of the grooves and the areas of the sections removed from the thin end portions immediately adjacent the shoulders form crank bearing surfaces immediately adjacent the grooves, the inner and outer surfaces of each section between the shoulders at opposite ends being smooth and free of any recesses or cavities.

2. In a multiple cylinder engine with a rotatable crank shaft having a crank portion with an axial oil passage therein and radial oil passages extending in opposite directions from the axial one to the periphery thereof and a connecting rod having an end encircling said crank portion and wherein the connecting rod and crank are on dead center when the connecting rod is reversing its direction of travel, the invention comprising:

a. a crank shaft connecting rod bearing insert fitted into said end of the connecting rod and surrounding said crank portion, said bearing comprising two like semi-circular sections with their confronting ends in abutting relation, each section having a rabbetted end portion across the full width thereof providing a recessed terminal area on the inner face of each end, the recessed terminal areas of confronting ends providing together a transverse lubricant escape groove of uniform width transversely across the entire inner surface of the two sections into the middle of which oil flows from one each of said radial passages on each revolution of the crank shaft, all of the rabbetted areas being bounded by a transverse shoulder with the shoulders all being parallel and forming boundaries along each side of the grooves and with the area of said sections removed from the recessed terminal portions but immediately adjacent said shoulders providing at all times a bearing surface for the crank portion, b. each section being of uniform thickness in the portion between the shoulder at one end and the shoulder at the other end, c. the two sections being so positioned in the connecting rod that the two grooves are 180° apart and each is 90° from the dead center position of the connecting rod and crank portion of the crank shaft.

3. The invention defined in claim 2 wherein the insert has slight clearance in the direction of the length of the connecting rod but not in a direction at right angles thereto for the crank to move within the sleeve when the crank shaft and connecting rod are cold, the thickness of the sections in a radial direction between said end portions being substantially uniform and with the inner face free of any residue-retaining cavities.

* * * * *